United States Patent Office 2,986,196
Patented May 30, 1961

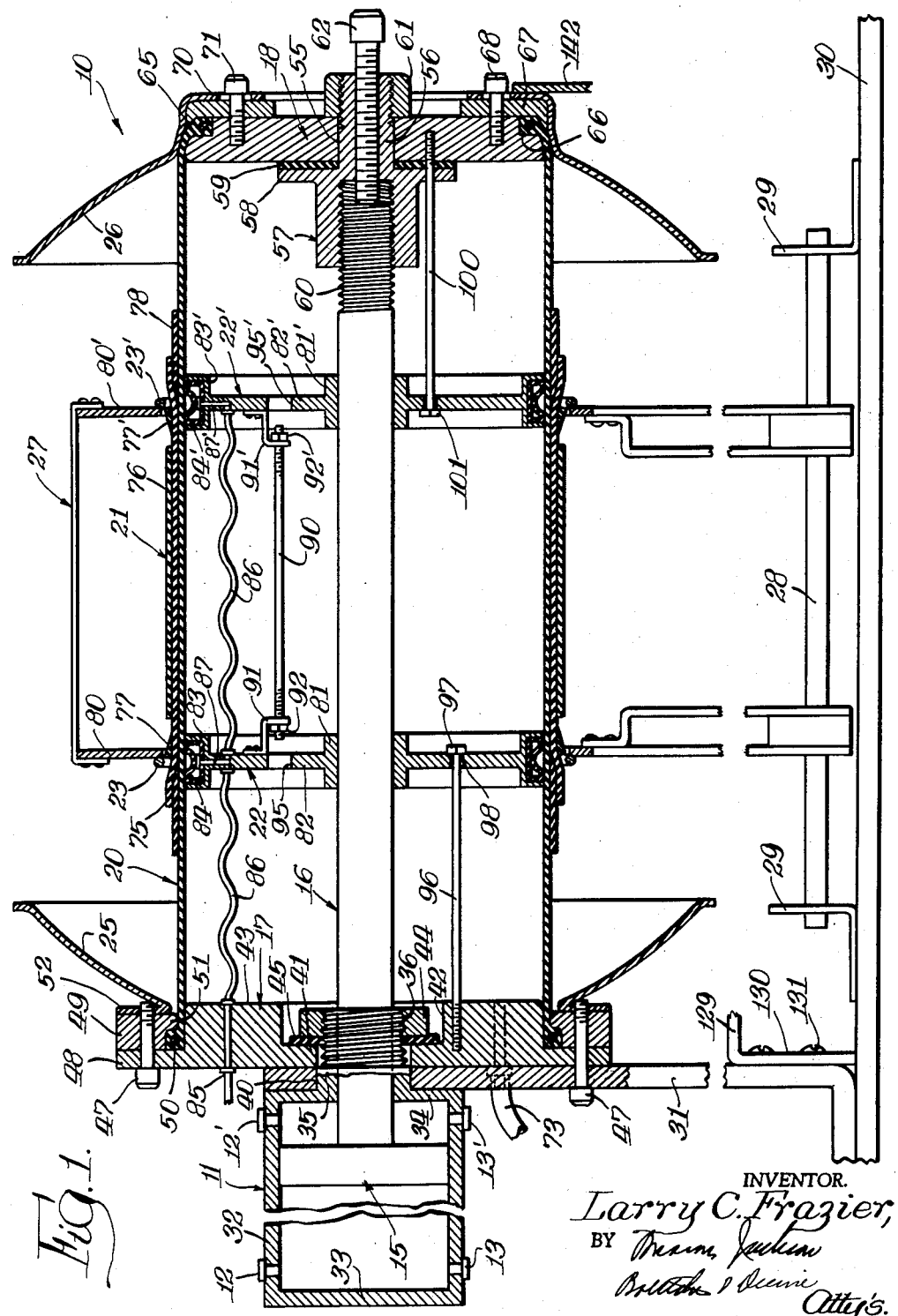

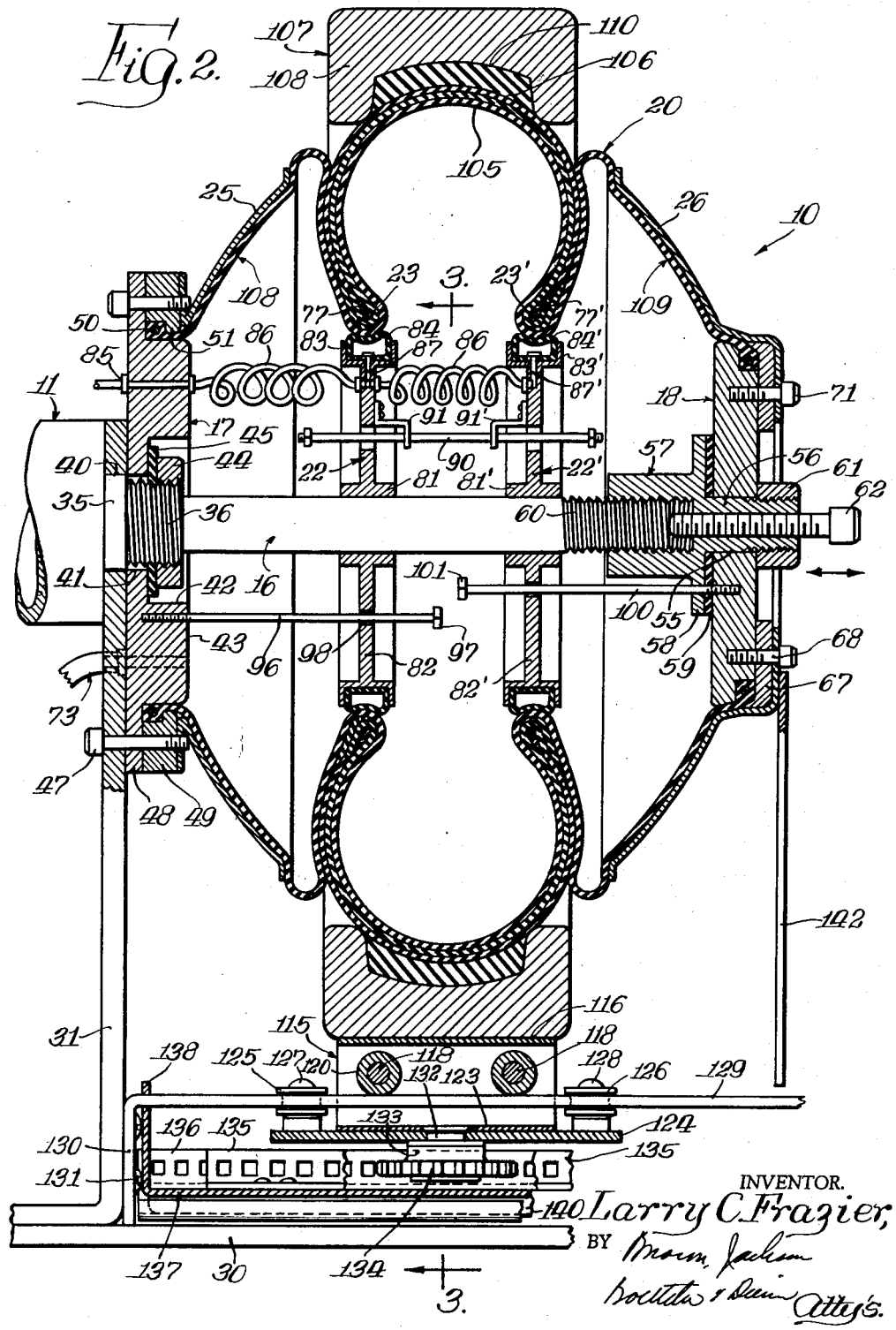

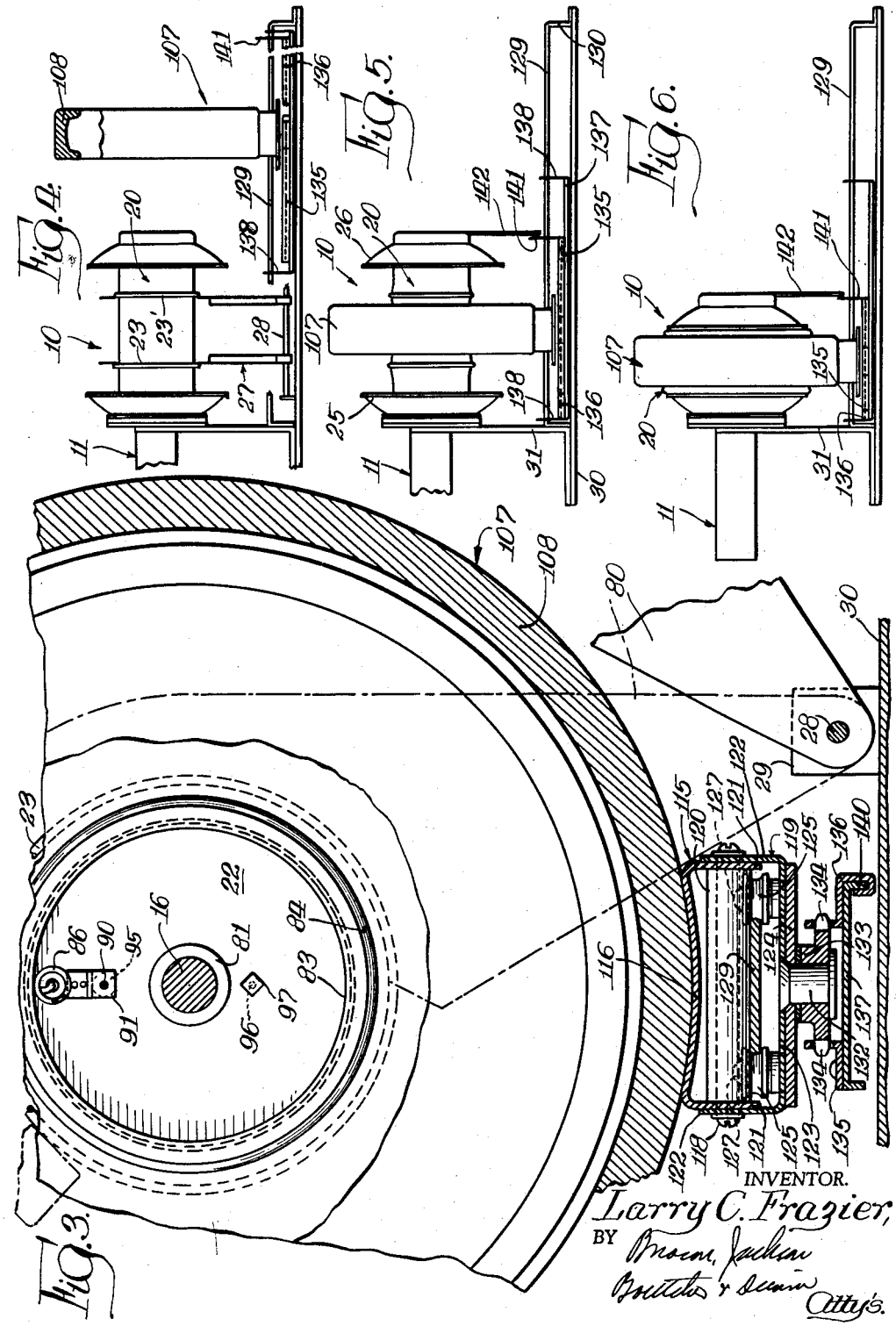

2,986,196

TIRE BUILDING MACHINE

Larry C. Frazier, Prescott, Ariz., assignor to National-Standard Company, Niles, Mich., a corporation of Delaware Filed Apr. 23, 1958, Ser. No. 730,310

4 Claims. (Cl. 154—9)

My invention relates generally to the art of tire building and particularly to new and useful improvements in machines for building pneumatic tires.

My invention finds particular utility in the manufacture of special classes of pneumatic tires, such as the so-called zero-angle tire.

The zero-angle tire, as will be discussed below, has certain structural features which inherently renders the conventional "flat-band" process of tire carcass construction inapplicable. However, with my invention, such a tire may be constructed according to "flat-band" principles of tire building.

The zero-angle tire conventionally includes an inextensible stricture band which is usually incorporated in the tire as a breaker or undertread ply, but may, if desired, be embodied in the tread itself. One known form of stricture band comprises a number of superposed plies having parallel cords of minimum elongation arranged at oppositely disposed small angles when measured relative to a plane passing perpendicular to the rotational axis of the tire in which such is embodied. Inclusion of such an inextensible stricture band, in a zero-angle tire, effectively prevents circumferential displacement of its tread element, thereby insuring the latter's substantially tangential engagement with the ground. A tire so constructed is accordingly maintained and operated with minimum displacement of the tread at its area of engagement with the ground, providing thereby more efficient rolling action and less resistance to movement over the ground. All of this means improved fuel economy for a vehicle equipped with zero-angled tires.

Various aspects and variations of the above-outlined tire construction are known in the art, but are of no particular concern to the present invention, other than that the machine hereinafter set out is especially adapted for the building of tires on a drum utilizing convenient aspects of the "flat-band" process and yet, operable to satisfy the exigencies of constructing zero-angle tires. By conventional and accepted "flat-band" tire building methods, it is usual to construct the tire carcass over an expansible cylindrical drum structure and to include therewith the tire beads, tread breaker strips, side walls, chafing strips, tread and other parts of a tire, as required. Drums presently known, as with the drum of this invention, are constructed so that after the "flat-band" carcass is completed thereon, the drum may be deflated and the carcass band removed for shaping and curing. This latter operation is normally brought about by expanding the carcass band, including the tread, into an annular tire shape and holding the same in a mold during a curing operation.

In constructing a zero-angle tire, however, it is necessary, while utilizing many of the desirable features of such "flat-band" building methods to depart importantly therefrom in certain respects, particularly the shaping operation, as above outlined, since the inextensible stricture band effectively prevents conventional expansion of the central part of the carcass and tread. It is not feasible, therefore, to construct, with presently known apparatus, a "flat-band" zero-angle carcass including the tread or inextensible stricture band with any reasonable expectation of subsequently shaping the carcass band into a tire form for curing. My present invention, however, contemplates an improved apparatus which employs desirable expedients of the "flat-band" structure and adapt them to the construction of zero-angle tires.

In brief, this invention relates to an improved drum assembly which is mounted in cantilever fashion and presents a cylindrical surface on which a "flat-band" tire carcass may be formed; such surface being selectively expanded and contracted radially by hydraulic, pneumatic or mechanical force. The drum also includes a pair of head members, movable relative to one another for extending and contracting the drum axially in response to operation of a single operating means. Means are also included for locating and securely holding tire bead rings concentrically about the forming drum for their incorporation in a tire carcass. Conveniently, such rings serve to confine the drum radially intermediate its ends so that its eventual expansion produces three annular or torus sections. By axially contracting the expanded drum, certain of its inflated sections serve to tightly wrap and seal carcass fabric about the bead rings. Additionally, the central portion of the "flat-band" carcass is converted into an annulus which is radially thrust into sealing engagement with a substantially inextensible tire component, held concentrically about the drum and maintained substantially centrally thereof through the latter's axial movements. After proper manipulation of the drum, the annular tire carcass, complete with mounted inextensible tread, or like inextensible element, may be removed from the drum for subsequent curing operations, according to conventional practice.

An important object of my invention is to provide a new and improved tire building apparatus for forming a "flat-band" carcass on a building drum and for associating the same with another tire component having a diameter greater than that of the "flat-band" and including an inextensible stricture element.

Another object of this invention is to provide a new and improved tire building apparatus for forming a "flat-band" pneumatic tire carcass and for shaping said band into an annulus and applying a tread thereto.

A further object of this invention is to provide a new and improved drum structure for a tire building machine which is especially suited for the mechanized production of tires embodying a substantially inextensible stricture band for preventing radial expansion of the tire tread.

A still further object of this invention is to provide a new and improved tire building apparatus for forming a "flat-band" carcass of cylindrical formation, including inextensible bead members of fixed diameter; such apparatus being capable of forming the "flat-band" into an annular form and applying the same to a radially inextensible tire component.

A still further object of my invention is to provide a tire forming drum which is capable of being expanded in three axially distinct sections.

Another important object of this invention is to provide a tire building drum, as aforesaid, which is capable of expanding different sections of a "flat-band" tire carcass formed thereabout to distinctly different diameters and in so doing to turn or flip fabric tightly about inextensible bead rings of the tire carcass.

A still additional and important object of this invention is to provide an improved means for anchoring tire bead rings in selected positions on a tire building drum.

Still another important object of this invention is to provide a forming drum for building a substantially cylindrical tire carcass, the carcass including inextensible tire bead rings which are utilized to restrict expansion of the forming drum and carcass at preselected areas to effect an automatic folding of the carcass fabric about the tire bead rings, thereby anchoring the same in the carcass, and further forming the cylindrical carcass into a substantially annular form.

A still further object of this invention is to provide a new and improved tire building drum embodying improved and simplified operating mechanisms and arrangements of elements leading to a more efficient, simplified, and positive fabrication of a tire carcass, complete with tread element.

The above and further objects, features, and advantages of this invention will appear to those skilled in the art from the following detailed description of a preferred embodiment of my invention, as illustrated in the accompanying drawings.

In the drawings:

Figure 1 is a foreshortened view in side elevation, with certain portions thereof shown in cross section, taken substantially along the longitudinal center line of a typical forming drum assembly constructed according to this invention.

Figure 2 is a view similar to Figure 1 showing the forming drum assembly thereof in a retracted condition at which the tread in the tire may be applied to the annular-shaped carcass;

Figure 3 is a partial enlarged cross-sectional view taken along line 3—3 of Figure 2 and looking in the direction indicated by the arrows; and Figures 4, 5, and 6 are schematic representations showing the sequence of events and operational steps involved in utilizing an improved tread applicator with the forming drum assembly of Figures 1, 2, and 3.

In Figure 1 of the drawings, I have shown my improved tire building drum assembly 10 which generally comprises a single pneumatic operating cylinder 11 having air inlet means 12 and 12' and exhaust valve means 13 and 13', disposed to work on opposite sides of a piston 15 within cylinder 11. Piston 15 is connected to one end of piston rod 16 and the latter passes through a fixed head member 17. The other end of rod 16 is attached to a movable head member 18 which parallels head 17. An elastic inflatable building bag 20 formed as an open ended sleeve has its opposite ends anchored to the two-spaced head members 17 and 18. Such sleeve can be reinforced, if desired, with cords of wire, nylon, or other substantially inextensible materials laid lengthwise of the sleeve and imbedded in the sidewalls thereof. Bead ring stabilizing wheels 22, 22' are mounted internally of bag 20 for sliding movement along the piston rod 16 to hold a pair of tire bead ring assemblies 23, 23' in place during the carcass forming operations, while annular pusher plates 25 and 26 are attached to overhang opposite ends of the drum head members 17 and 18.

A locator 27 is pivotally mounted substantially midway of the building bag 20 to assist in locating and spacing the bead rings 23, 23'. To this end, a shaft 28, carried in brackets 29, 29' and attached to a ground engaging base member 30, is provided to pivotally carry the locator 27. An upright pedestal 31, or like supporting means, is also provided to extend upwardly from one end of the base member 30 to support the building drum assembly 10 in cantilever fashion.

Referring now in detail to drum assembly 10, cylinder 11 includes a tubular side wall 32 and is closed over at one end by a first end wall 33. The opposite end of cylinder 11 is closed by a second end wall 34 which has a central opening for the passage of the operating piston rod 16 which slides through an extending collar portion 35 provided with external threads 36. Collar portion 35 passes through a suitable opening 40, formed adjacent the upper end of the support pedestal 31 and also through a registering opening 41 formed centrally of the fixed head member 17. Opening 41 is bordered by a recess 42 countersunk in the inner face 43 of head member 17 for receiving a holding nut 44. Nut 44 engages the threads 36 of the collar portion 35 and serves to press a washer 45 against the bottom wall of recess 42, thereby effecting a seal between the interior of cylinder 11 and bag 20.

The stationary head 17 is attached to the upright pedestal 31 by several cap screws 47, or like attachment means, and such pass through a peripheral flange portion 48 of the head member. Screws 47 also thread into an annular rim member 49 to hold the same tightly against the flange 48, thereby to lock a retainer ring 50, associated with one end of the building bag 20 behind a projecting shoulder portion 51 of the rim member 49. With this assembly, tightening the several cap screws 47 draws rim member 49 toward flange 48 to tightly grip and compress the projecting retainer ring 50 and thereby seal one end of bag 20 to the head member 17.

Additionally, the several cap screws 47 threadingly engage and pass through an annular flange portion 52 associated with a first, cup-shaped pusher plate 25; holding the latter concentrically overhanging one end of the forming bag 20.

The movable head member 18 is adjustably connected to the outer end of the piston rod 16, so that the length of the forming drum may be varied, within limits, to accommodate various size tire carcass structures. In particular, head member 18 is formed, like head 17, as a cylindrical disc bearing a central opening 55 for the passage of a cylindrical extending neck portion 56 of an attachment collar 57. Collar 57 also includes an enlarged radially projecting flange portion 58 substantially midway of its length, such acting to engage and press an annular seal washer 59 tightly against the adjacent inner end face of the head member 18; to make sealed connection with the latter. The main body of the collar member 57 further is internally threaded at one end for engaging external threads 60 at the outer end of the piston rod 16. Thus, the collar member may be threadingly adjusted along the piston rod to vary the position of head member 18.

The outer end of the collar 57 and particularly the extending neck portion 56 thereof is externally threaded to receive holding nut member 61 which, when tightened, serves to compress a seal washer 59 tightly against the head member 18. An adjusting bolt 62 also threads through the extending neck portion 56 to contact the inner end of the piston rod 16. Bolt 62 acts as a locking device to hold or fix the adjusted position of collar 57 on the piston rod 16.

In addition to the retainer ring 50, previously described, the forming bag 20 also includes a second retainer ring 65 at its opposite end. Ring 65 is seated behind a recessed annular shoulder 66 formed at the periphery of head member 18 and held in place by an annular rim member 67 fitted over the outer end of the head member 18 and held thereon by plural cap screws 68.

Head 18 also carries the second pusher plate 26 in such a manner that the same extends radially outward to overhang the outer end of the forming bag 20. Such plate 26 is detachably connected to the head member 18, so that it may be removed for mounting the bead rings 23, 23 about the drum and when removing a finished carcass. To this end, bayonet slot means 70, or the like, are used to lock the pusher plate in place beneath enlarged heads 71 of the several cap screw members 68, according to known practice. With this arrangement, partial rotation of the pusher plate 26 enables one to quickly detach and remove the same, as required.

It will be understood by those familiar with the art, that application of air or hydraulic pressure to opposite sides of piston 15 serves to reciprocate piston rod 16, moving the head 18 accordingly toward or away from the fixed head member 17. These movements are accompanied by corresponding inflation and deflation of the forming bag through manipulation of supply and exhaust means 73 which controls radial expansion and contraction of the forming bag and its cooperation with the pusher plates 25 and 26 which confine its expansion, as illustrated in Figure 2.

It will be recognized that with the above-described general arrangement, the forming drum is supported at one end in cantilever fashion leaving its outer end free and unobstructed for applying the bead rings 23, 23' and for removing a finished tire carcass. Further, and most importantly, this removal function is unobstructed by any mechanism for actuating the forming drum; axial motivation thereof taking place through the operation of the single actuating means, comprising piston 15 and cylinder 11 at the left-hand end of the drum, while its radial displacement is controlled by inflating and deflating the forming bag 20.

In laying a typical "flat-band" carcass 21 for a zero-angle tire about the forming drum, slight pressure is first applied to the outer end of piston 15 in order to tension bag 20 slightly. This provides a substantially rigid surface for laying one or more plies of carcass fabric 75 thereabout. The layer of fabric 75 may, for example be overlaid with an undertread and side wall layer 76 and a pair of surrounding annular bead gum neck members 77, 77' are normally located axially inward and adjacent to the bead ring members 23, 23'. Tread rim or bead strip and chafer plies 78, 78' are also provided one beneath each end of the carcass layer 75, adjacent to the bead rings 23, 23', thus completing a conventional form of "flat-band" carcass.

Proper location of the bead ring members 23, 23' relative to the bead gum neck members 77, 77' may be accomplished, as shown, by operation of the locator means 27 which comprises a pair of arm members 80, 80' spaced laterally a distance substantially equal to the axial spacing desired between the bead rings 23, 23' in a completed carcass. In use, locator means 27 is swung into position (see its dotted-line showing in Figure 3), so that arms 80, 80' thereof lie closely adjacent the exterior of the building bag, opposite the gum strips 77, 77'. Thus, bead rings 23 and 23', previously slipped onto the drum over the right-hand end thereof, after first removing the pusher plate 26, may be properly positioned against the axially outermost faces of the arm members 80, 80'.

After the bead rings have been so positioned, it is necessary, additionally, to hold the same in place during the carcass forming operation. This may be accomplished conveniently by means of the pair of bead ring stabilizing wheels 22, 22' which are disposed radially inwardly of the forming bag 20 and slide along the piston rod 16. Such stabilizing wheels 22, 22', respectively, include hub portions 81, 81' through which the piston rod 16 is coaxially passed, while web portions 82, 82' of the wheels interconnect their respective hub portions with substantially U-shaped peripheral rim sections 83, 83'. The rim sections are provided with peripheral recesses for housing inflatable annular bags 84, 84' which are located within the forming bag and normally are disposed opposite the desired location for the bead rings 23, 23'.

A suitable pneumatic system, including tubular connection means 85 mounted in the head member 17, flexible conduit means 86, and branch passageway means 87, 87' supply and exhaust pressurized air to and from the two annular bag means 84, 84'. Inflation of the bag means 84, 84' expands the same and the surrounding building bag 20 to hold the surrounding bead rings 23, 23' under radial thrust at desired positions on the forming bag 20. Preferably, flexible conduit means 86 is of sufficient length to permit axial movement of the stabilizer wheels 22, 22' along the piston rod 16, as required.

In order to properly carry out the above-described holding function, it is essential for the stabilizer wheels to be properly spaced within the forming bag 20. To insure such proper spacing, I have devised a simple expedient comprising a first rod 90 extending between opposing brackets 91, 91' which are attached, respectively, to the two wheels 22, 22'. Rod 90 passes through the brackets and is held slidably therebetween by nut members 92, 92' threaded onto its outer ends. This arrangement serves to space and limit the distance which the wheels 22, 22' may move apart. Also, since wheels 22, 22' may move toward one another during axial collapse of the tire building drum, suitable openings 95, 95' are provided in the wheel web portions 82, 82' to provide clearance for passage of the adjusting rod 90, when the distance between the wheels becomes less than the length of the rod.

Since the two wheels 22, 22' are slidingly movable along the piston rod 16, it is essential that means be provided also for insuring proper location of the wheels relative to desired positions for the rings 23, 23' when the forming drum is fully extended, as shown in Figure 1. For this purpose, a first adjusting bolt 96 extends between wheel 22 and the fixed head member 17 and is provided with an enlarged head portion 97 at its one end to prevent its passage through the wheel web 82, while its outer end is threaded into a suitable opening formed in the head member 17. Thus, movement of the wheel 22 to the right, as viewed in Figure 1, is limited by the bolt means 96. Such limit of movement away from the fixed head 17 may be regulated by threadingly adjusting the bolt 96, as desired.

In a similar manner, a second adjustable bolt 100, provided with an enlarged head portion 101, extends between the web 82' of the second stabilizer wheel 22' and the movable head 18. This bolt serves to regulate the spacing and distance between wheel 22' and movable head 18. Thus, as head 18 moves to the right with piston rod 16, wheel 22' is also moved when the head 101 of the bolt 100 engages the wheel web 82'. Wheel 22 also follows to the limit of bolt 96 and rod 90, the latter of which interconnects the two wheels 22, 22'.

From the foregoing description, it will be understood that I have provided an expansible forming drum assembly on which a carcass structure 21 may be formed substantially as a tube or cylindrical band. Particularly, with the fabric of the tire carcass wrapped tightly around the tensioned forming bag 20, pusher plate 26 is removed and the tire bead rings 23, 23' are placed over the outer free end of the drum assembly. Such bead rings are positioned at desired locations by operation of the locator 27, and the annular holding bag members 84, 84' are inflated to lock the bead rings in place. This latter action serves to move bag 20 and the intervening carcass ply 75 radially outward slightly to engage the bead rings 23, 23', holding the latter in a vice like grip. Once bead rings 23, 23' are so anchored in position, the locator means 27 is pivoted out of the way. Thereafter, air is supplied to the interior of the building bag 20 by means of the supply and vent valve 73, inflating the same. Simultaneously, air is applied to the right-hand side of the actuating piston means 15 through the supply valve 12', causing movement of the piston rod 16 and attached head 18 to the left, as viewed in Figure 1. This axial movement of head means 18 is carried on until the desired axial contraction of the building drum has been achieved.

The two bead rings 23, 23', which are tightly held in place by the inflated internal bag means 84, 84' serve to hold the carcass fabric firmly anchored in place on the building bag. Conveniently, rings 23, 23' also serve to radially restrict expansion of the building bag to require its expansion in three axially distinct sections, although other means may be provided for this function. Thus, upon radial expansion of the building bag, the carcass expands radially with the building bag 20 in three sections, as separated by the restrictive bead rings 23, 23'.

The central section of the building bag, as indicated by numeral 105, expands outwardly into a substantially annular form or torus carrying the carcass and particularly the undertread layer 76 radially outward to meet and press against the inside surface of a tire tread 106 or other inextensible tire component being held in a tread applicator 107. The remaining end sections 108 and 109 of the building bag, which flank the central section 105, also move radially outwardly to press against the inclined cup-shaped surfaces presented by the surrounding pusher plates 25 and 26. Such end sections of the carcass fold around the bead rings 23, 23' and serve thereby to lift the end edges of the carcass ply 75 and rim strips around the tire bead rings and into engagement with the adjacent inflated side walls of the central tire carcass section 105. The pusher plates 25 and 26 also move axially relative to one another with movement of the head 18 to press the inflated end sections 108 and 109 of the building bag toward one another and against the intervening inflated central section 105 with sufficient pressure to insure proper sealing contact of the component parts of the carcass side walls. This particularly seals and wraps the end portions of the ply 75 and the strips 78 tightly around the bead rings 23, 23'. Thus, I perform automatically and simultaneously with application of the tread element, what is commonly known, in the tire building art, as a "turn-up" operation.

The radial and axial movements of the building bag sections 105, 108 and 109, defined by the axial spacing of the tire bead rings, further causes the two stabilizer wheels 22, 22' to be drawn axially toward one another until they assume an equalized position, substantially as illustrated in Figure 2, and substantially definitive of the desired spacing between bead rings in the finished tire carcass. Also, such outward radial expansion and axial contraction of the building bag 20, and particularly expansion of its central section 105, causes the initially formed "flat-band" carcass to assume an annular formation which most importantly drives the undertread layer 76 into sealing engagement with the surrounding tire tread 106 held in tread applicator 107.

Turning to Figures 2 and 3 of the drawings, the tread applicator 107 is shown therein to comprise a substantially annular ring or band 108 having a recess 110 formed in its inner periphery for registering reception of a molded tire tread element 106 which may include an inextensible stricture band, as previously discussed. Ring 107 is supported at its lower end on bracket means 115, constituting a substantially U-shaped member having an upper wall 116, welded to the applicator band 108.

Bracket member 115, in turn, is secured by a pair of pin members 118, 118 to an underdisposed horseshoe-shaped bracket 119; spacer members 120 being mounted on pins 118 to act as reinforcing spacer means between the depending arm portions 121 of the bracket member 115. Pins 118 also pass through arm portions 122, 122 of bracket 119 and a central platform portion 123 interconnects such arm portions. Platform 123 is welded securely to an undersupporting plate 124 on which are mounted opposed pairs of rollers 125 and 126 rotatable on spaced vertical axle members 127 and 128, respectively.

These roller pairs engage opposite lateral edges of an elongated guide rail 129 which passes between the bracket members 115 and 119 in a substantially horizontal position over the supporting base 30. The outer ends of the rail 129 are turned downwardly to provide foot portions 130 which engage the base 30 to maintain rail 129 thereabove. One of such portions 130 may be affixed to the pedestal 31, if desired, as by rivet connectors 131, or like fastening means (see Figure 2).

Depending substantially centrally from the platform portion 123 and the underdisposed plate 124 is a vertical axle 132 carrying a single sprocket wheel means 133. The teeth 134 of such sprocket wheel simultaneously engage laterally spaced and parallel disposed rack elements 135 and 136 mounted beneath and parallel to the rail element 129, as best shown in Figure 3.

The one rack element 135 is riveted or spot-welded securely to the upper face of an underlying support plate 137 which has upturned end portions 138 embracing the overlying rail 129 for sliding movement therealong. The other rack element 136 embraces a depending leg portion 140 provided at one lateral edge of the support plate 137 so that the same may be moved slidingly along the support plate 137. The outer end of the rack 136 is further equipped with an upwardly turned finger portion 141 engageable with an arm 142 depending from the movable head member 18.

With this arrangement, once the "flat-band" tire carcass has been completed, as previously outlined, the tread applicator ring 108 may be moved into position concentrically about the forming drum by sliding the same and its supporting undercarriage along the rail 129. By this means, the tread 106 may be positioned substantially midway of the length of the building drum and substantially centrally over the undertread fabric layer 76. Such operational condition is outlined in the schematic Figure 5 of the drawings.

It will be understood from Figure 5 that the one end of supporting bracket 137 engages and is stopped against the depending arm portion 130 of rail 129 whereat such is attached to the pedestal 31. Also, the two rack elements are in an extended condition with the sprocket wheel 134 disposed between their adjacent inner ends, while the finger element 142, which is attached to the movable head 18, is positioned to engage the upwardly extending finger portion 141 at the outer end of the rack 136. Therefore, upon axial contraction of the building drum to a condition, as shown in Figure 6, for example, simultaneous movement of the rack element 136, relative to the sprocket wheel and movement of the latter along the fixed rack 135, takes place. This activity serves to maintain the tread applicator substantially centrally about the building drum, as the latter is axially contracted.

Thus, as pressure is applied to the piston means 15 to axially contract the building drum, the rack elements 135 and 136 move in opposite directions relative to the single sprocket wheel, simultaneously and in equal amounts, to maintain the tread element 106 in a constant position with respect to the center of the entire building drum. Upon the inflation of the bag means 20, the tread member 106 is, therefore, properly positioned and disposed for contacting engagement with the radially expanded undertread element 76. Thus, the tread member may be successfully applied, while the carcass is mounted on the building drum. This feature is most important when considering the construction of zero-angle tires in which the tread of an undertread element includes a substantially inextensible stricture element, as previously discussed.

Upon completion of the tread mounting phase, the pressurized air is exhausted from the building bag, the tread applicator is removed, the bead ring holding bags 84, 84' are deflated, and the building drum is returned to its initial extended condition by applying pressurized fluid to the left end of the operating piston 15. Thereafter, the completed carcass, including an inextensible tread or undertread element may be removed from the building drum after first removing the interfering pusher plate 26.

From the foregoing, it is believed that those skilled in the art will readily appreciate the advanced features which mark the present invention over the prior art and will also recognize the improved tire building concepts wherein the end portions of the bag, which lie axially beyond the bead rings in the tire carcass, are expanded to wrap the same tightly with the rim strips 78 and adjacent carcass portions. This turn-up feature is accompanied also by the substantially simultaneous application of the tire tread to the inflated central section of the "flat-band" carcass. With this mode of operation, construction of an entire tire carcass is substantially automatic and free of any particular skilled operation by the operator, other than the application of the various fabric layers and elements of the carcass.

It will be understood that, while I have herein shown and described the features and concepts of the preferred embodiment of my invention, numerous changes, modifications, and substitutions of equivalents may be made therein without departing from the spirit and scope of my invention. As a consequence, I do not intend to be limited to the particular device shown and above-described, except as may appear in the following appended claims.

I claim:

1. A forming drum for a tire building machine comprising, a pair of head members, mounting means for said head members for mounting the same in coaxially spaced apart relation and for axial movement toward and away from each other, an inflatable bag extending between and connected at its opposite ends to said head members, said bag being axially inextensible and in the furthermost spaced apart position of said head members being substantially cylindrical to provide for the laying of tire building material therearound and between its opposite ends, radially inextensible bead rings positioned axially inwardly of the ends of said bag and the tire building material thereon for preventing radial expansion of said bag and said tire building material thereat, means associated with said bag for supplying fluid under pressure thereto, said bag upon supply of fluid under pressure thereto being radially expanded and axially contracted into a central annular portion and a pair of end portions to divide said tire building material, correspondingly, into a central annular section and a pair of end sections, and said end portions of said bag being moved axially inwardly toward said central portion of said bag by said head members to engage said end sections of said tire building material with said central section of said tire building material radially outwardly of said bead rings.

2. A forming drum for a tire building machine comprising, a pair of head members, mounting means for said head members for mounting the same in coaxially spaced apart relation and for axial movement toward and away from each other, an inflatable bag extending between and connected at its opposite ends to said head members, said bag being axially inextensible and in the furthermost spaced apart position of said head members being substantially cylindrical to provide for the laying of tire building material therearound and between its opposite ends, bead ring locating means associated with said bag for positioning radially inextensible bead rings axially inwardly of the ends of said bag and the tire building material thereon for preventing radial expansion of said bag and said tire building material thereat, means associated with said bag for supplying fluid under pressure thereto, said bag upon supply of fluid under pressure thereto being radially expanded and axially contracted into a central annular portion and a pair of end portions to divide said tire building material, correspondingly, into a central annular section and a pair of end sections, and said end portions of said bag being moved axially inwardly toward said central portion of said bag by said head members to engage said end sections of said tire building material with said central section of said tire building material radially outwardly of said bead rings.

3. A forming drum for a tire building machine comprising, a pair of head members, mounting means for said head members for mounting the same in coaxially spaced apart relation and for axial movement toward and away from each other, an inflatable bag extending between and connected at its opposite ends to said head members, said bag being axially inextensible and in the furthermost spaced apart position of said head members being substantially cylindrical to provide for the laying of tire building material therearound and between its opposite ends, bead ring locating means inwardly of said bag and radially expansible to hold radially inextensible bead rings in fixed positions axially inwardly of the ends of said bag and the tire building material thereon for preventing radial expansion of said bag and said tire building material thereat, means associated with said bag for supplying fluid under pressure thereto, said bag upon supply of fluid under pressure thereto being radially expanded and axially contracted into a central annular portion and a pair of end portions to divide said tire building material correspondingly into a central annular section and a pair of end sections, and said end portions of said bag being moved axially inwardly toward said central portion of said bag by said head members to engage said end sections of said tire building material with said central section of said tire building material radially outwardly of said bead rings.

4. A tire building machine comprising, a pair of head members, mounting means for said head members for mounting the same in coaxially spaced apart relation and for axial movement toward and away from each other, an inflatable bag extending between and connected at its opposite ends to said head members, said bag being axially inextensible and in the furthermost spaced apart position of said head members being substantially cylindrical to provide for the laying of tire building material therearound and between its opposite ends, radially inextensible bead rings positioned axially inwardly of the ends of said bag and the tire building material thereon for preventing radial expansion of said bag and said tire building material thereat, means associated with said bag for supplying fluid under pressure thereto, said bag upon supply of fluid under pressure thereto being radially expanded and axially contracted into a central annular portion and a pair of end portions to divide said tire building material correspondingly into a central annular section and a pair of end sections, said end portions of said bag being moved axially inwardly toward said central portion of said bag by said head members to engage said end sections of said tire building material with said central section of said tire building material radially outwardly of said bead rings, and applicator means disposed concentrically outwardly of said bag for holding a tire element of a diameter greater than said bead rings radially outward of said bag for engagement by said central section of the tire building material when said bag is radially expanded and axially contracted.

References Cited in the file of this patent

UNITED STATES PATENTS

| | | |
|---|---|---|
| 1,525,455 | Logan | Feb. 10, 1925 |
| 1,551,040 | Marquette | Aug. 25, 1925 |
| 2,084,009 | Sohl | June 15, 1937 |
| 2,182,176 | Maranville | Dec. 5, 1939 |
| 2,565,071 | Frazier | Aug. 21, 1951 |
| 2,614,951 | Iredell | Oct. 21, 1952 |
| 2,715,031 | Frazier | Aug. 23, 1955 |
| 2,754,886 | Bishop | July 17, 1956 |
| 2,814,330 | Vanzo et al. | Nov. 26, 1957 |
| 2,814,331 | Vanzo et al. | Nov. 26, 1957 |

FOREIGN PATENTS

| | | |
|---|---|---|
| 175,754 | Great Britain | Feb. 20, 1922 |
| 555,680 | Great Britain | Sept. 2, 1943 |